United States Patent
Tedjar et al.

(10) Patent No.: US 7,820,317 B2
(45) Date of Patent: Oct. 26, 2010

(54) METHOD FOR THE MIXED RECYCLING OF LITHIUM-BASED ANODE BATTERIES AND CELLS

(75) Inventors: Farouk Tedjar, Grenoble (FR); Jean-Claude Foudraz, Fontaine (FR)

(73) Assignee: Recupyl, Domene (FR)

(*) Notice: Subject to any disclaimer, the term of this patent is extended or adjusted under 35 U.S.C. 154(b) by 990 days.

(21) Appl. No.: 10/593,332

(22) PCT Filed: Apr. 4, 2005

(86) PCT No.: PCT/FR2005/000814
§ 371 (c)(1),
(2), (4) Date: Sep. 19, 2006

(87) PCT Pub. No.: WO2005/101564
PCT Pub. Date: Oct. 27, 2005

(65) Prior Publication Data
US 2007/0196725 A1     Aug. 23, 2007

(51) Int. Cl.
*H01M 6/50* (2006.01)
(52) U.S. Cl. .................. 429/49; 429/179; 241/23
(58) Field of Classification Search ............ 241/23; 423/179.5; 429/49, 179
See application file for complete search history.

(56) References Cited

U.S. PATENT DOCUMENTS

| | | | |
|---|---|---|---|
| 2,548,037 A * | 4/1951 | Minnick et al. | 423/195 |
| 5,882,811 A | 3/1999 | Kawakami | |
| 5,888,463 A | 3/1999 | McLaughlin et al. | |
| 6,447,669 B1 * | 9/2002 | Lain | 205/705 |
| 6,511,639 B1 | 1/2003 | Schmidt et al. | |
| 6,524,737 B1 * | 2/2003 | Tanii et al. | 429/49 |
| 2003/0134199 A1 * | 7/2003 | Christian et al. | 429/223 |
| 2003/0180604 A1 * | 9/2003 | Zenger et al. | 429/49 |
| 2004/0013732 A1 * | 1/2004 | Farber et al. | 424/488 |

FOREIGN PATENT DOCUMENTS

| | | | |
|---|---|---|---|
| EP | 0 620 607 A1 | | 10/1994 |
| EP | 0620607 A1 * | | 10/1994 |
| EP | 1 333 522 A1 | | 8/2003 |
| FR | 2 704 098 | | 10/1994 |
| FR | 2 812 973 | | 2/2002 |

(Continued)

OTHER PUBLICATIONS

McLaughlin, "Lithium Recycling and Disposal Techniques," Presented at the Fifth Annual International Seminar on Battery Waste Management, Deerfield Beach, Florida, Nov. 1-3, 1993.

(Continued)

*Primary Examiner*—Stuart Hendrickson
*Assistant Examiner*—Richard M Rump
(74) *Attorney, Agent, or Firm*—Oliff & Berridge, PLC

(57) ABSTRACT

The invention relates to a method for treating all types of lithium anode cells and batteries by means of a hydrometallurgical process at room temperature. The treatment method enables cells and batteries comprising a metallic lithium-based anode or an anode containing lithium incorporated in an anodic insertion compound to be treated under safe conditions, thus enabling the metallic casings, electrode contacts, cathode metal oxides and lithium salts to be separated and recovered.

13 Claims, 6 Drawing Sheets

FOREIGN PATENT DOCUMENTS

| | | |
|---|---|---|
| FR | 2 827 710 | 1/2003 |
| FR | 2827710 A1 * | 1/2003 |
| JP | A 6-322452 | 11/1994 |
| JP | A 7-245126 | 9/1995 |
| JP | 10-046266 | 2/1998 |
| JP | A 10-74539 | 3/1998 |
| JP | A 10-158751 | 6/1998 |
| JP | A 10-287864 | 10/1998 |
| JP | A 10-330855 | 12/1998 |
| JP | A 11-185833 | 7/1999 |
| JP | A 11-242967 | 9/1999 |
| JP | A 2000-313926 | 11/2000 |
| TW | 501294 B | 9/2002 |
| WO | WO 99/34473 | 7/1999 |
| WO | WO 02/23651 A1 | 3/2002 |
| WO | WO 03/021708 A2 | 3/2003 |

OTHER PUBLICATIONS

Yamada et al., "Optimized $LiFePO_4$ for Lithium Battery Cathodes," Journal of Electrochemical Society, 148, 3, pp. 224-225, 2001.

"The Sumitomo- Sony Method," Presented during the 5$^{th}$ International Seminar on Used Battery and Cell Management, Floriday, Oct. 1998.

Susan Budavari, Editor, "The Merck Index, An Encyclopedia of Chemicals, Drugs, and Biologiccals," Twelfth Edition, Merck Research Laboratories, pp. 1137, reference No. 6710, 1996.

Lide, Editor-in-Chief, "Handbook of Chemistry and Physics, 1913-1995," 75$^{th}$ Edition, pp. 8-60, 8-61 and 4-70.

* cited by examiner

METHOD FOR THE MIXED RECYCLING OF LITHIUM-BASED ANODE BATTERIES AND CELLS

BACKGROUND OF THE INVENTION

The invention relates to a method for hydrometallurgical treatment of cells and batteries comprising at least a lithium-based anode, a salt dissolved in an electrolyte and a cathode comprising at least one metal or a combination of metals selected from cobalt, nickel, manganese and iron, for recovering the recoverable fractions.

STATE OF THE ART

The increase in portable electronic products has resulted in an expansion of the cells market (30 billion dollars in 1998) with an annual growth of 6% and the autonomy requirements via sources having a good energy density have doped the portable batteries market which presents an even greater growth (12%). In particular, lithium systems have made considerable progress over the last few years (plus 45% in 3 years).

At the present time, batteries called ion lithium batteries and polymer electrolyte batteries are the major technological innovation of the last fifty years in the electrochemical generator field. However, despite the numerous advantages related to performances, lithium systems continue to constitute a large source of products having a recognized environmental impact. The effects are mainly related to the following components:

heavy metals such as cathodic materials,
conducting salts with a fluorine, arsenic or sulfonated compound base
organic solvents and
a very reactive alkaline metal.

Many of these elements are not degradable and often present a high degree of toxicity either directly as regards the health of human beings and animals or indirectly by polluting the soil, water, plants and food chain. Even disseminated in waste, they contribute to polluting larger matrices or to accentuating already problematic situations in the case of incineration with household waste. Moreover, dispersing metals in waste is in contradiction with preservation of natural resources. Furthermore, some of the metals used in lithium systems are difficult and expensive to extract.

The state of the art shows a large number of attempts to make proposals for treating lithium systems. Thus, the U.S. Pat. No. 6,511,639 describes a method for recovering negative electrodes by means of a thermal treatment and only concerns lithium ion batteries. In the document WO-A-0223651, the treatment associates a cryogenic step followed by an incineration step and only concerns vanadium oxide-based polymer lithium batteries.

The method described in French Patent application FR-A-2812973 proposes wet crushing of lithium ion batteries and nickel metal hydride batteries whereas the method described in the document JP-A-11185833 proposes a solution based on a thermal treatment and only concerns lithium ion batteries. The method according to the Patent application WO-A-9934473 proposes extraction using acetonitrile and only concerns lithium ion batteries.

The method according to the U.S. Pat. No. 5,882,811 proposes cutting with a water jet followed by electrolysis in molten LiCl medium and distillation of the electrolyte. It only concerns lithium ion batteries as does the method according to the Patent application JP-A-10330855 which proposes direct thermal treatment in a rotary furnace.

The method according to the Patent application JP 10287864 proposes extraction by solvent and only relates to lithium ion batteries. The methods according to the Patent applications JP 10046266, JP 10158751 and JP-A-10074539 propose a thermal treatment comprised between 350° C. and 1000° C. and only concern lithium ion batteries.

On the other hand, the only methods industrially implemented in the world are two in number:

1—The method called TOXCO proposed in the U.S. Pat. No. 5,888,463 and presented by W J. McLaughlin, Lithium battery recycling Proceedings of the 5th International Seminar on Battery Waste Management (Florida 1993). It is applied in the United States for recycling batteries and cells made of lithium in a mixture ($LiSO_2$, $LiSOCl_2$, $LiMnO_2$, $LiFeS_2$, Li-ion and $LiCF_x$). The batteries and cells are frozen in liquid nitrogen at −196° C. before being crushed. The homogenates are recovered in an alkaline solution to neutralize the acid compounds emitted ($H_2$, $SO_2$, $SOC_{12}$ ...) and to hydrolyze the organic solvents. The lithium salts formed ($Li_2SO_4$, LiCl) are separated from the residual metallic and plastic fragments by a screening operation. Adding sodium carbonate to the solutions enables the lithium to be precipitated in carbonate form before purification and recrystallization of a technical quality salt. No indication is given on recovery of the cathodic metals.

2—The SONY-SUMITOMO method presented during the 5th International Seminar on used battery and cell management (Florida USA, October 1998). It is applied in Japan only on Li-ion batteries. The method is based on calcination at a temperature of about 1000° C. in a furnace. After calcination, the residues are crushed and screened. The screened powder contains cobalt oxides and other oxides. No lithium recycling indication is given.

In a general manner, it can be observed from the state of the art that:

Thermal methods give rise to large problems of gas emissions in particular of greenhouse effect gases and are in contradiction with the commitments of the states that signed the recent international agreements.

Wet channel crushing processes give rise to large safety problems as regards the hydrogen emitted when the batteries are crushed. This problem also arises in relation with any method proposing a mixture of lithium batteries and aqueous system.

The use of acetonitrile gives rise to large safety problems in particular for the operating personnel and for emissions in the natural environment.

And finally, two major handicaps are ascertained among all the proposed methods:

1—Among 11 proposed methods, only one method is designed to treat all types of lithium batteries, 2—Two methods out of the 11 are used industrially to date.

Lastly, in non-thermal methods, no precise and safe solution is proposed for management of opening of the batteries.

OBJECT OF THE INVENTION

The object of the invention is to provide a treatment method enabling the shortcomings of the prior art to be remedied and, more particularly, providing a framework for performing recycling of lithium systems without any pollution transfer with a maximum recovery ensuring conversion of the resource into added-value compounds.

According to the invention, this object is achieved by the appended claims. More particularly, this object is achieved by the fact that the method comprises dry crushing at room temperature in an inert atmosphere, treatment by at least magnetic separation and densimetric table followed by aqueous hydrolysis to recover at least the lithium in carbonate or lithiophosphate form, an anion of said electrolyte salt and a concentrate comprising at least one metal of said cathode.

BRIEF DESCRIPTION OF THE DRAWINGS

Other advantages and features will become more clearly apparent from the following description of particular embodiments of the invention given as non-restrictive examples only and represented in the accompanying drawings, in which.

DESCRIPTION IF PARTICULAR EMBODIMENTS

Figure 1:
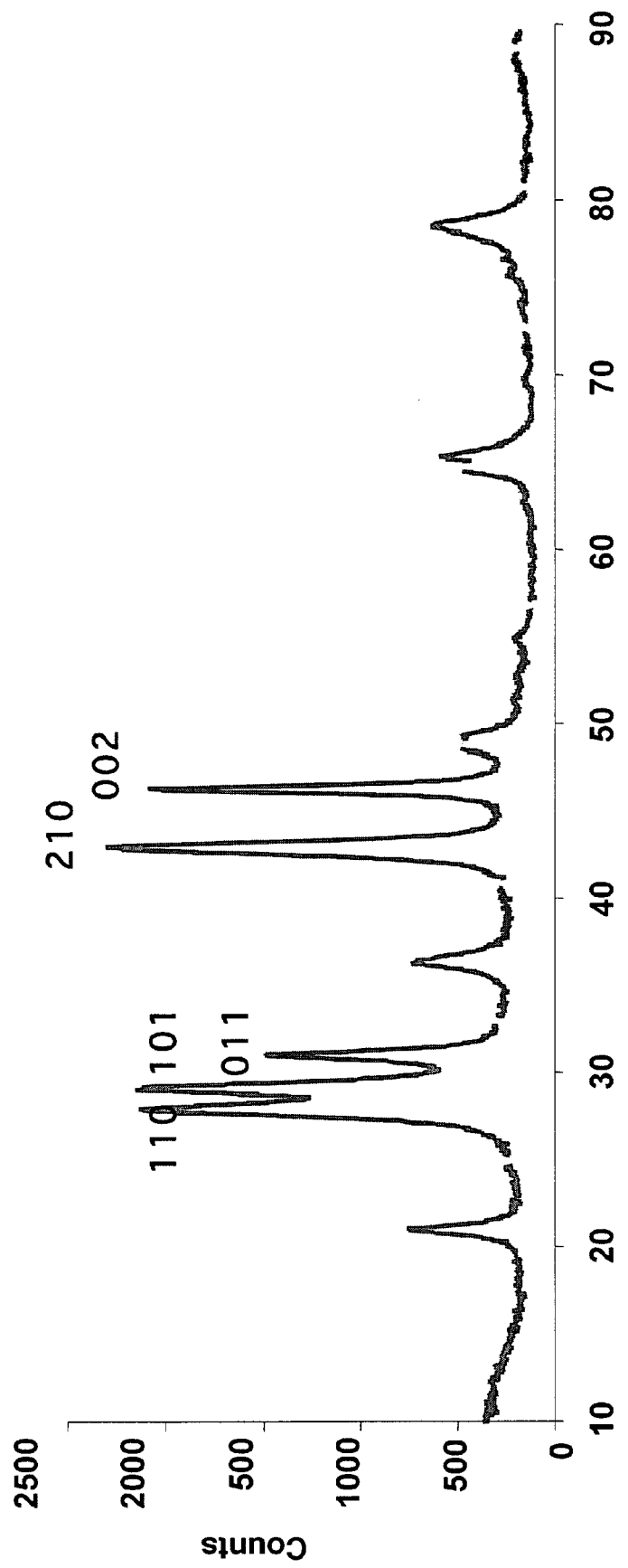
FIG. 1 represents the X-ray diffraction spectrum of the hydrated lithiophosphate with a half a water molecule obtained by a particular embodiment of a treatment method according to the invention.

To overcome the different shortcomings set out above, the present invention relates to a method for treating all lithium systems separately or mixed. To perform recycling of batteries for beneficiation purposes, it is important to open the system by crushing the batteries to access the recyclable fractions. However, a lot of batteries to be recycled still have a strong charge and crushing them produces sparks and large inflammations or even explosions in particular with $SO_2$ or $SOCl_2$ systems. To avoid these two drawbacks, two complementary solutions are implemented in the present invention.

Crushing is made safe by means of inert gases in very economical manner by placing the crushing system in an enclosure with a controlled atmosphere and pressure and by using suitable crushing systems.

In a first embodiment of the invention, the crushing operation is performed beforehand by shredding by means of a rotary shearing machine with a low speed of rotation preferably less than 11 revolutions per minute (rpm). This step is designed to release the internal stresses of the batteries. In a second step, the shredded charge is crushed in a rotor system rotating at a mean speed preferably lower than 90 rpm.

In a second embodiment of the present invention, the two crushing systems are placed in a tightly sealed enclosure made inert by means of a gas that is either argon, or carbon dioxide, or a suitable mixture of the two gases. Examination of the densities of the gases show that argon and carbon dioxide will provide a good protection above the crushed charge.

| Gas | Density |
|---|---|
| Nitrogen | 1.229 |
| Oxygen | 1.404 |
| Argon | 1.743 |
| Carbon dioxide | 1.931 |

These two gases will expel the oxygen and nitrogen and provide a gas covering above the mill blades and above the crushed batteries. In addition, the presence of carbon dioxide will result in initiating passivation of the metallic lithium by formation of lithium carbonate at the surface, which slows down the reactivity of this metal.

In the case of a mixture of these two gases, the proportion varies from 10% to 90% of argon and from 90% to 10% of carbon dioxide, but the proportion of argon in the mixture is advantageously comprised between 10% and 35%.

Gas injection is controlled by the residual oxygen content and by the internal pressure. These two parameters are advantageously set at:

1—an oxygen content comprised between 100 and 10000 ppm but preferably close to 5000 ppm, 2—a differential pressure comprised between 30 and 130 millibars but preferably close to 80 millibars.

Injection of inert gas is preferably only performed if one of the two parameters exceeds the setpoint values which enables the setpoint value of the consumptions to be considerably reduced.

The crushed charge is then sent to a vibrating screen with a mesh size smaller than or equal to 3 mm and equipped with a high-induction magnetic separator at the end of its output and with a densimetric table. This operation enables 4 fractions to be obtained in a single run:

1—the undersized fine fraction which is rich in metal oxides and carbon,

2—the magnetic fraction which is composed of stainless steel from the casings of the cells and batteries, 3—the dense non-magnetic fraction which is composed of non-ferrous metals and 4—the non-magnetic fraction with a low density and which is composed of a mixture of paper and plastic.

Only the undersized fine charge, obtained at 1 and composed of metal oxides and carbon, has to be subjected to subsequent treatment. This treatment begins by screening at 500 micrometers which enables an undersized fraction rich in cobalt and poor in copper (<0.3%) to be obtained. This charge can then be a material treated by any recycling method of metal oxides, in particular those having a base comprising cobalt, nickel and manganese or any mixture of these three metals.

In a particular embodiment of the present invention, the undersized fine charge that passes the screening is suspended in heavily stirred water. This turbulence in the bath enables the metal and lithium oxides to be released. Mixing the lithium hydroxide in solution will alkalize the solution up to a pH of more than 12.

Hydrolysis of the crushed charge leads to the formation of hydrogen. However, management of the addition rate of the charges in the leaching reactor and creation of a very strong turbulence above the bath prevent risks of inflammation of the hydrogen and of explosion. This operation is associated with making the atmosphere above the bath poorer in oxygen. This air comes from the suction of the mill casing and enables an oxygen-poor atmosphere to be maintained so as to permanently be at a concentration of less than 0.5% in volume, which is situated in the safety range of hydrogen. At the end of the hydrolysis reaction and after filtration, an alkaline solution of lithium salts and a suspension of metal oxides and of carbon are obtained.

The solution is then treated so as to separate the dissolved lithium whereas the insoluble charge is treated to recover the cathodic metals. Recovery of the dissolved lithium is performed from a solution having a pH close to 12. Acidification by means of a suitable reactant enables the lithium salt to be precipitated.

In a particular application of the present invention, the lithium is precipitated in the form of carbonate and the gases output from the mill are used as carbon dioxide input as precipitation reactant. This particular embodiment of the invention is advantageously applicable in the case of recycling of a mixture of cells and batteries including thionyl chloride systems. This advantage is obtained by means of the different solubility of the three gases in water at room temperature and at ambient pressure.

| Gas | Solubility at 20° C. g/100 g of water |
| --- | --- |
| $SO_2$ | 11.9 |
| HCl | 20 |
| Carbon dioxide | 0.168 |

Precipitation is performed by adjusting the pH from its initial value close to 13 to a value of 9. The precipitated product is washed by carbon dioxide-saturated water then dried at 105° C. On account of the solubility of $Li_2CO_3$, the residual lithium concentration remains high, about 1.8 g/l, and requires subsequent treatment.

In another application mode, the leaching solution having a pH of 12.1 and containing 11 g/l of lithium is neutralized by means of phosphoric acid at 85% to a pH of less than 8.5. The solution is then realkalized up to a pH of more than 12. The precipitate formed is then separated by filtration. The residual lithium concentration is 89 mg/l meaning that an extraction ratio of more than 99.15% is achieved. This residual lithium concentration is a limit concentration as it corresponds to the solubility of $Li_3PO_4$ which is 400 mg/l (Hand Book of Chemistry and Physics, D. L. Lide editor, 75th edition, 1993, monograph of chemistry and physics).

The precipitated solid is dried and then analyzed by X-ray diffraction and by chemical analysis. The $Li_3PO_4$ content is 93% and analysis by X-ray diffraction shows that the product is a hydrated lithiophosphate with a ½ water molecule and therefore a water content of 7%. This strongly confirms the purity of the product obtained as shown by the X-ray diffraction spectrum presented in FIG. 1

The washed charge is treated differently depending on its composition. As thionyl chloride cells have very little influence on the contribution of cathodic materials, the different charges will be differentiated according to the manganese/cobalt ratio.

Three cases are encountered during treatment of mixed lithium cells and batteries.

| Mixture of cells and batteries | | Relative concentration of cathodic materials | |
| --- | --- | --- | --- |
| | | Manganese | Cobalt |
| CASE N°1 | Primary lithium mixed with a small proportion of Lithium ion | High >95% | Low <5% |
| CASE N°2 | Primary lithium mixed with Lithium ion | Between 40 and 60% | Between 60 and 40% |
| CASE N°3 | Lithium ion alone | Low <2% | High >98% |

In case N°1, on account of its manganese composition, the fine charge composed of oxides and carbon is usable in all the methods described in the state of the art and in particular in the two methods respectively described in the Patent applications FR-A-2704098 and EP-A-0620607 and in the Patent applications FR-A-2827710 and WO-A-03021708.

In case N°2, the charge is dissolved in a 2N sulphuric medium at 80° C. in the presence of steel shot in an iron/cathodic mass ratio of 0.15. The pulp obtained is cooled down to 60° C. and then filtered. The solid part contains the carbon whereas the solution, which is at a pH of less than 3, contains zinc sulphate and manganese as well as other metallic impurities, in particular copper. The copper is cemented by means of steel shot. After cementation, divided metallic copper and a solution with a pH comprised between 2 and 2.85 are obtained. This pH is raised to a value of 3.85 by means of soda at 20%. This modification of the pH results in precipitation of the iron in the form of hydroxides. This purified solution is then neutralized at pH 5.8 and then subjected to electrolysis to obtain metallic cobalt in a traditional single-compartment electrolysis configuration. In particular, a previous treatment of the Applicant on zinc and manganese sulphate solutions as described in the Patent applications FR-A-2827710 and WO-A-03021708 can advantageously be used.

In the case of the present invention, electrolysis is performed at a temperature of 55° C. in a current density comprised between 400 and 600 A/m² by using a stainless steel cathode and an antimony-lead alloy anode. The manganese precipitates in oxyhydroxide form and in dioxide form. After filtration and leaching, it is sent to the recycling channels known in the state of the art and in particular those already mentioned for case N°1. The solution, which becomes poorer in cobalt and manganese, is richer in acid which is re-used at process input.

In case N°3, the charge is mixed in solution and then purified in the same way as for case N°2. The solution resulting from purification is then oxidized to a pH comprised between 2.3 and 2.8 by means of sodium hypochlorite to precipitate the cobalt hydroxide (III).

At the end of the treatment of cases 2 and 3, the solution contains a part of lithium salts resulting from reduction of the cobaltite or inserted in the $MnO_2$ of the primary elements. This solution is neutralized by means of soda at a pH of 8.5 to recover all the metals still remaining in the solution, and is then sent to the leaching water treatment where it undergoes the same treatment to recover the lithium in lithiophosphate form.

Figure 3:
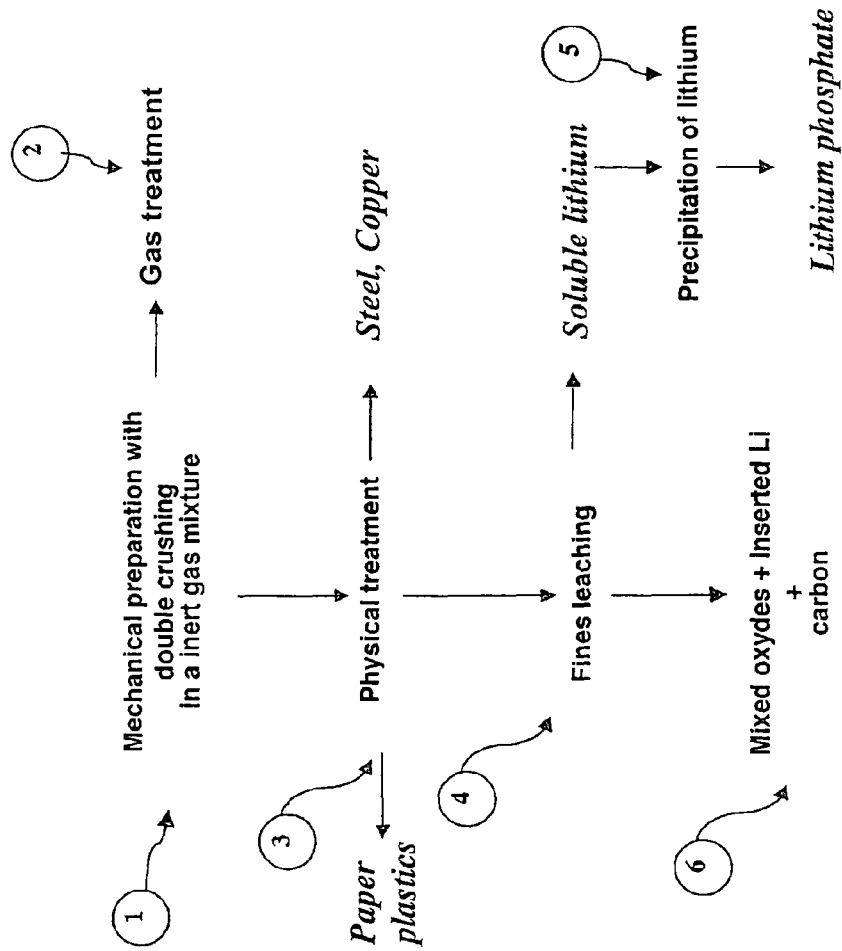
FIGS. 3 and 4 schematically represent the different steps of a treatment method according to the invention of a cell and/or a battery comprising a lithium-base anode.
Figure 4:
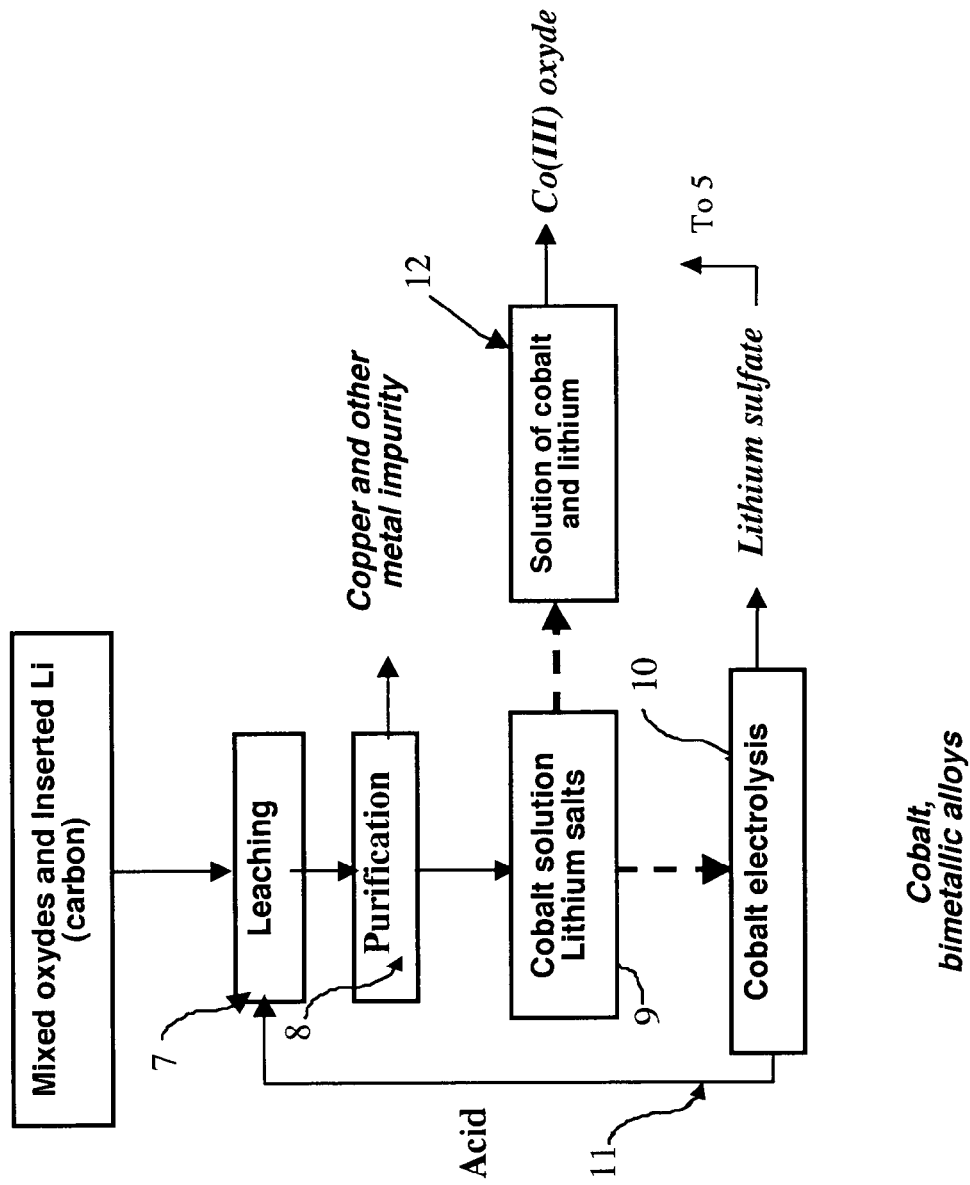

The industrial implementation method in a continuous process was designed on the basis of pilot tests at a size of 10 kg/hour attesting to the operational and industrializable nature of the invention as set out in FIGS. 3 and 4.

Figure 2:
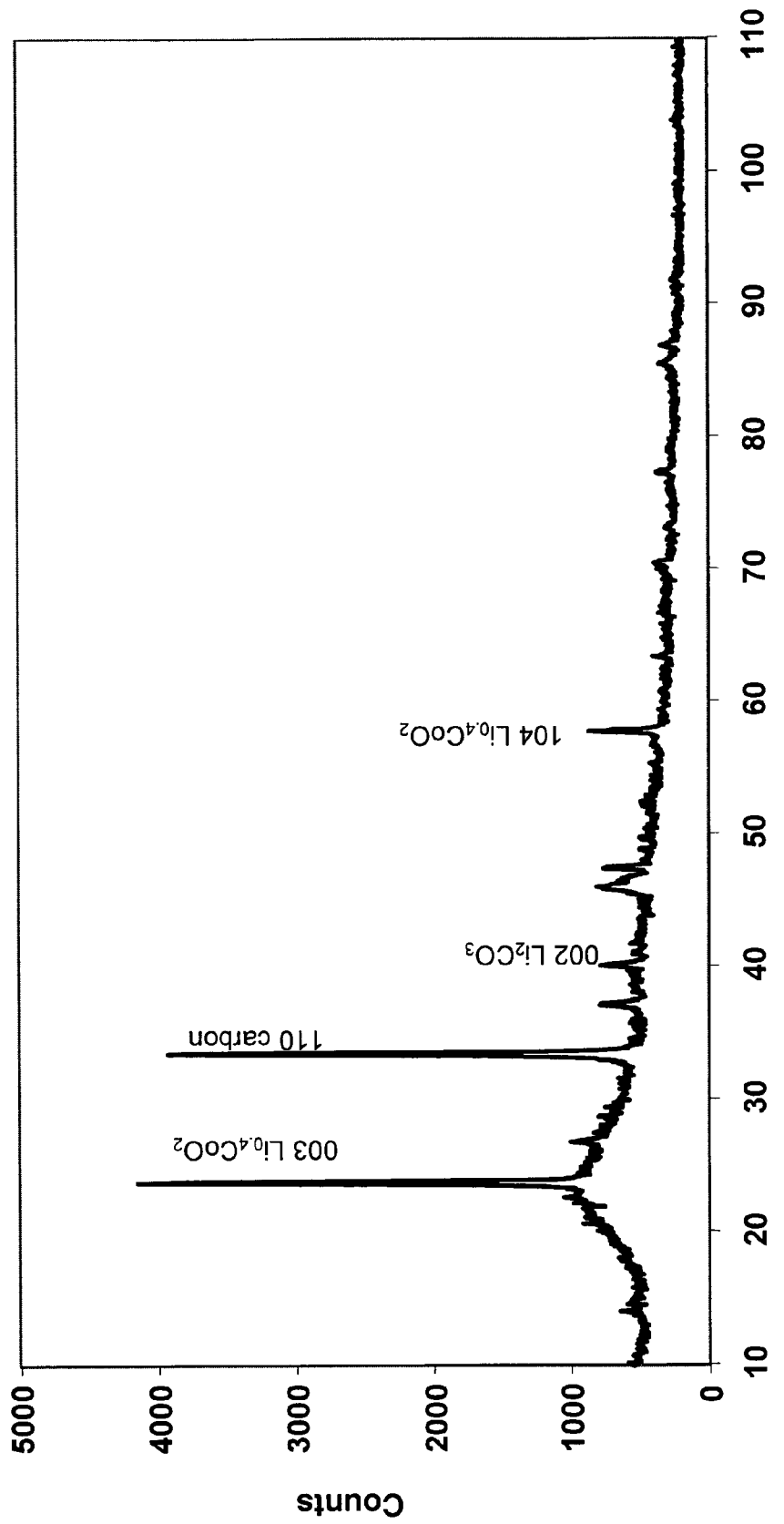
FIG. 2 represents the X-ray diffraction spectrum of the fine fraction obtained by a particular embodiment of a treatment method according to the invention.

The following description deals with a method for applying the present invention to lithium-ion batteries without this having an exhaustive nature. The mechanical treatment 1 is performed in a tight chamber wherein two mills are arranged in series. After the chamber has been scavenged by means of a gas composed of 20% argon and 80% carbon dioxide, 10 kg of mixed cells and batteries are input in continuous manner via a double air-lock. The gases output from 1 are treated at 2 by leaching with water and neutralization by means of soda. The homogenate is extracted by means of an endless screw via a double air-lock. It then undergoes physical treatment 3 by means of a high-induction magnetic separation and a densimetric table. On completion of this treatment, the fine and dense charge is composed of lithium cobaltite, carbon and lithium carbonate as shown by the X-ray diffraction spectrum presented in FIG. 2. It is treated by leaching with water at 4 to recover the soluble lithium. After solid/liquid separation, the solution is sent for recovery of the lithium by precipitation at 5 whereas the solid fraction of cobaltite 6 is recyclable in metallurgy in processes where cobalt has to be added. The characteristics are:

| Parameters | Value |
|---|---|
| Total cobalt | 34.56% |
| Lithium | 3.2% |
| Iron | 0.15% |
| Copper | 0.87% |
| Carbon | 8.1% |

To illustrate the feasibility of the whole method emanating from the present invention, the solid fraction 6 resulting from the treatment 5 is sent for acid leaching 7. After dissolution of the lithium cobaltite, the solution is filtered to separate the carbon and is then purified from the metals other than cobalt at 8. The cobalt sulphate and lithium solution 9 is then separated into two fractions. A first fraction is subjected to electrolysis 10. On completion of this electrolysis, cobalt cathodes are obtained and also a solution poor in cobalt sulphate and enriched in sulphuric acid 11 that is sent to leaching input. The second fraction is oxidized by means of sodium hypochlorite at 12 to obtain a trivalent cobalt hydroxide. The solution then no longer contains any lithium sulphate which is sent to 5 for precipitation of the lithium phosphate.

In this implementation, recycling of the lithium cobaltite is well proven in three different treatment channels (cobaltite as is, cobalt cathode and trivalent cobalt hydroxide). The three channels being illustrated as to their industrial feasibility, the choice will depend on the capacity of the installation and on the proximity of the recycling channels.

Extension to the Recovery of the PF6 Anion:

It is commonly recognized that the salt LiPF6 breaks down in water as follows:

$LiFP_6 + H_2O \rightarrow LiF + HF + POF_3$

Figure 5:
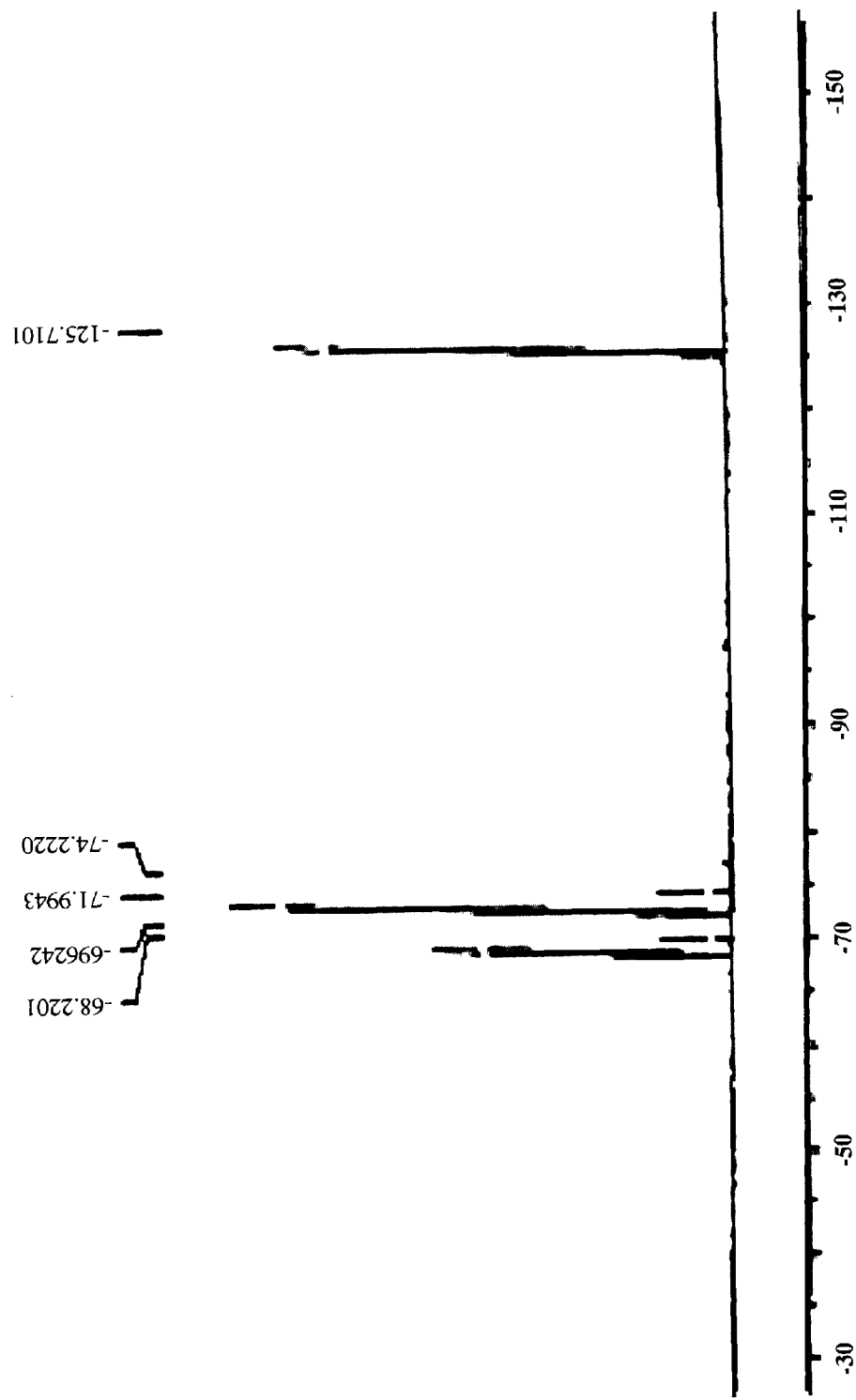
FIGS. 5 and 6 represent the NMR spectra using 188 MHz scanning for fluorine 19 and 81 MHz scanning for phosphorus 31 of a phase containing the $PF_6$ ion and obtained by a particular embodiment of a treatment method according to the invention.
Figure 6:
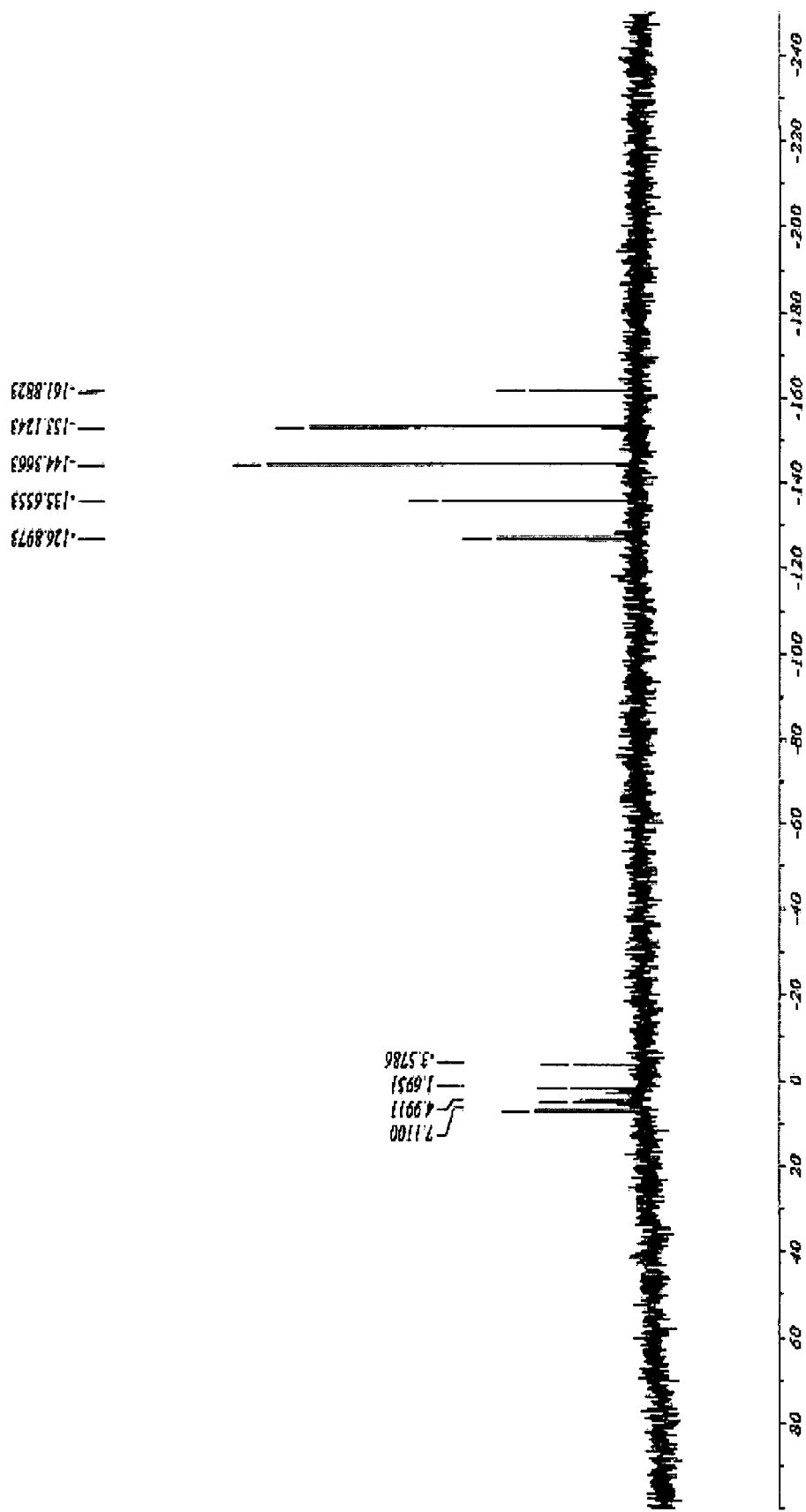

This results in the $PF_6$ anion disappearing and in gas being released above the aqueous solution. During our experiments, we ascertained that when treating mixed batteries and cells with a Li—$SOCl_2$ and Li—$MnO_2$ or Li-Ions base, no emission took place. This confirms the stability of $LiPF_6$ in aqueous solution under our conditions. We then sought to confirm the presence of the $PF_6$ anion by analysis. The hydrolysis solutions recovered at 4 (FIG. 3) were analyzed by Nuclear Magnetic Resonance (NMR) using scanning at 188.3 MHz for fluorine 19 and at 81 MHz for phosphorus 31. It is known that phosphorus resonates in the form of a heptet and fluorine in the form of a doublet. The values of constants and the chemical displacements of 19F and 31P (FIGS. 5 and 6) enable the $PF_6$ ion to be identified in an aqueous solution without any ambiguity. We deduced therefrom that one of the components provided by the chloride cells played the stabilizing role of the $PF_6$ anion. These components are $SO_3$, HCl, LiCl and $AlCl_3$. Our complementary tests to study the stability of LiPF6 in the presence of these components showed that LiCl plays the role of stabilizer of LiPF6 in an aqueous solution.

As the $PF_6$ anion is stable in our aqueous solutions, we looked for possible ways of recovering it. The state of the art did not show any known way for precipitating the $PF_6$ ion in aqueous effluents. Studying the solubility of various $PF_6$ salts led us to seek for a cation enabling the hexofluorophosphate ion to be quantitatively precipitated. This precipitation was conducted in an aqueous medium from our stabilized solutions. We directed our studies towards larger cations than the lithium cation. As the solutions are stabilized by the chloride anion, we tried the chlorides of alkaline cations such as ammonium. The solubilities obtained are:

| Cation | Solubility M/I of $PF_6$ |
|---|---|
| Na+ | 5.59 |
| K+ | 0.43 |
| NH4+ | 0.11 |
| Rb+ | 0.076 |
| Cs+ | 0.03 |

It became apparent that the solubility depends, among other things, on the size of the cation as shown by the following table setting out the solubility versus the ionic radius:

| Cation | Solubility M/I of PF6- | Ionic radius (A°) |
|---|---|---|
| Na+ | 5.59 | 0.98 |
| K+ | 0.43 | 1.33 |
| $NH_4$+ | 0.11 | 1.43 |
| Rb+ | 0.076 | 1.49 |
| Cs+ | 0.03 | 1.65 |

The lowest solubilities are achieved with very onerous cations such as Cs and Rb, incompatible with an industrial application. The solubility achieved with the ammonium ion (0.43 M/L, i.e. 3.3 g/l) remains insufficient for quantitative recovery. We therefore had to direct our research towards larger cations. As the solubility obtained with the ammonium ion is however rather low, we then used quaternary ammonium salts of the $R_4N^+$ type (with R=methyl, ethyl and butyl). These products are extensively used, in particular in industrial manner and in particular as cationic surfactants in the detergent industry. The solubilities obtained are all lower than those obtained with the ammonium ion but remain higher than $8 \times 10^{-3}$ M/l (i.e. 1.2 g/l). We then explored other larger cations and in particular those reputed to give relatively low solubilities with the perchlorate ion the configuration whereof is close to that of hexafluorophosphate. Better results than the previous ones were obtained with two cations which are:

the hexamine complex of nickel: $[Ni(NH_3)_6]^{2+}$ and dihydro-1,4-diphenyl-3,5-phenylimino-1,2,4-triazole (Merck Index N°12,6711):

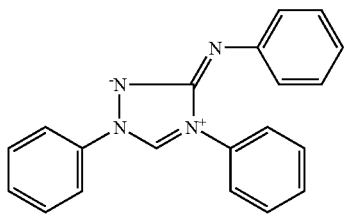

The solubilities obtained at room temperature are s<200 mg/l for the hexamine complex of nickel and s<20 mg/l for the Dihydro-1,4-diphenyl-3,5-phenylimino-1,2,4-triazole.

Extension to Recovery of New Lithium Iron Phosphate-Based Cathodic Materials.

The cathodes of lithium-ion batteries marketed at present are lithium cobaltite base. However, the cost and toxicity of cobalt on the one hand and the safety problems that may result from the use of cobaltite on the other hand have led to large research efforts being made to develop new cathodic materials. According to the state of the art, the most promising material seems to be lithium iron phosphate (LiFePO$_4$). We synthesized lithium iron phosphate according to A. Yamda et al. *Journal of Electrochemical Society*, volume 148 N°3 pA224 (2001). Then we proceeded to treat this compound as a cathodic mass 6 resulting from the physical-chemical treatment as described in FIG. 3.

The material is placed in solution in a 2N sulphuric medium at 80° C. in the presence of steel shot with an iron/cathodic mass ratio of 0.15. The solution obtained is cooled to 60° C. and then oxidized by means of 30% volume hydrogenated peroxide at pH 3.85. The iron is then separated in the form of oxyhydroxide of the ghoetite type. The lithium solution is then treated according to the method described in 5 in FIG. 3/5. By this method of implementation, the iron, lithium and phosphate of the cathodic material are recovered. By this method of implementation, the method remains applicable when modifications take place in the composition of lithium batteries with a change in the cathodic composition.

The invention claimed is:

1. Method for hydrometallurgical treatment of cells and batteries comprising at least:
    a lithium-based anode,
    a salt dissolved in an electrolyte, and
    a cathode comprising at least a metal or a combination of metals selected from the group consisting of cobalt, nickel, manganese and iron, for recovering recoverable fractions, the method comprising:
    dry crushing at room temperature in an inert atmosphere,
    treatment by at least magnetic separation and densimetric table followed by an aqueous hydrolysis,
    for the purposes of recovering at least:
        lithium in the form of carbonate or lithiophosphate,
        an anion of the salt dissolved in the electrolyte, and
        a concentrate comprising at least one metal of said cathode,
    wherein the salt dissolved in the electrolyte comprises hexafluorophosphate PF$_6$ anion and hexafluorophosphate PF$_6$ anion is stabilized in an aqueous solution by means of LiCl.

2. Method according to claim 1, wherein crushing is performed in an atmosphere comprising a gas selected from the group consisting of argon and carbon dioxide or a mixture of argon and carbon dioxide in respective proportions of 10% to 90% of argon and 90% to 10% of carbon dioxide.

3. Method according to claim 2, wherein the proportion of argon in the argon and carbon dioxide mixture is between 10% and 35%.

4. Method according to claim 1, wherein crushing is performed by means of two successive mills the first of which operates at a maximum speed of 11 rpm and the second of which operates at a speed of less than 90 rpm.

5. Method according to claim 4, wherein the first mill is a rotary shearing mill whereas the second mill is an impact mill.

6. Method according to claim 1, wherein crushing forms a homogenate that is treated by a device that combines sieving to 3 mm followed by sieving to 500 micrometers, high-induction magnetic separation and a densimetric table and screening in order to separate from the homogenate, in a single run: a magnetic fraction, a dense non-magnetic fraction, a magnetic fraction with a low density and a fine fraction at least rich in metal oxides.

7. Method according to claim 6, wherein the fine fraction, formed a sieving undersized, is treated by leaching with water to recover soluble lithium in the form of lithiophosphate.

8. Method according to claim 7, wherein precipitation of the lithiophosphate is obtained by double modification of the pH by means of soda and phosphoric acid.

9. Method according to claim 7, wherein the fine fraction, from which the soluble lithium has been removed and comprising at least the cathode composed of at least a metal or a combination of metals, is dissolved in a 2N sulphuric medium at a temperature of 80° C. in the presence of steel shot in a ratio between the iron and the fine fraction from which the soluble lithium has been removed of 0.15.

10. Method according to claim 9, wherein a solution resulting from acid attack of said cathode and after purification by selective precipitation of the metallic impurities is subjected to electrolysis at a temperature of 55° C. under a current density comprised between 400 and 600 A/m$^2$ using two electrodes made of stainless steel and antimony-lead alloy.

11. Method according to claim 9, wherein said solution, in the case of a cobalt-based cathode attack, is a cobalt-rich solution and is treated using hypochlorite after the pH has been regulated to a value comprised between 2.3 and 2.8 to obtain a trivalent cobalt hydroxide.

12. Method according to claim 1, wherein the hexafluorophosphate PF$_6$ anion is recovered by precipitation by means of simple ammonium salts, quaternary ammonium, ammoniac nickel complex or Dihydro-1,4-diphenyl-3,5-phenylimino-1,2,4-triazol.

13. Method according to claim 1, wherein the cathode being LiFePO$_4$-based, it is treated by means of 2N sulphuric acid at 80° C. and then with 30% volume hydrogenated peroxide at 60° C. to separate the iron from the lithium and phosphate.

* * * * *